US011449796B2

(12) United States Patent
Song et al.

(10) Patent No.: US 11,449,796 B2
(45) Date of Patent: Sep. 20, 2022

(54) MACHINE LEARNING INFERENCE CALLS FOR DATABASE QUERY PROCESSING

(71) Applicant: Amazon Technologies, Inc., Seattle, WA (US)

(72) Inventors: Sangil Song, Bellevue, WA (US); Yongsik Yoon, Sammamish, WA (US); Kamal Kant Gupta, Belmont, CA (US); Saileshwar Krishnamurthy, Palo Alto, CA (US); Stefano Stefani, Issaquah, WA (US); Sudipta Sengupta, Sammamish, WA (US); Jaeyun Noh, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 539 days.

(21) Appl. No.: 16/578,060

(22) Filed: Sep. 20, 2019

(65) Prior Publication Data

US 2021/0174238 A1 Jun. 10, 2021

(51) Int. Cl.
*G06F 7/00* (2006.01)
*G06N 20/00* (2019.01)
(Continued)

(52) U.S. Cl.
CPC .......... *G06N 20/00* (2019.01); *G06F 16/2433* (2019.01); *G06F 16/24542* (2019.01); *G06N 5/04* (2013.01)

(58) Field of Classification Search
CPC ........... G06F 16/2433; G06F 16/24542; G06F 1616/2465; G06F 19/24; G06F 19/707;
(Continued)

(56) References Cited

U.S. PATENT DOCUMENTS 7,809,663 B1 * 10/2010 Birch ................ G06N 20/00
706/14
2008/0222093 A1 * 9/2008 Fan ................. G06F 16/24545
(Continued)

FOREIGN PATENT DOCUMENTS

CN 110046169 A 7/2019
WO 2020/185330 A1 9/2020

OTHER PUBLICATIONS

International Search Report and Written Opinion, PCT App. No. PCT/US2020/051072, dated Nov. 27, 2020, 11 pages.

*Primary Examiner* — Mohammed R Uddin
(74) *Attorney, Agent, or Firm* — Nicholson De Vos Webster & Elliott LLP

(57) ABSTRACT

Techniques for making machine learning inference calls for database query processing are described. In some embodiments, a method of making machine learning inference calls for database query processing may include generating a first batch of machine learning requests based at least on a query to be performed on data stored in a database service, wherein the query identifies a machine learning service, sending the first batch of machine learning requests to an input buffer of an asynchronous request handler, the asynchronous request handler to generate a second batch of machine learning requests based on the first batch of machine learning requests, and obtaining a plurality of machine learning responses from an output buffer of the asynchronous request handler, the machine learning responses generated by the machine learning service using a machine learning model in response to receiving the second batch of machine learning requests.

14 Claims, 10 Drawing Sheets

(51) Int. Cl.
*G06F 16/242* (2019.01)
*G06F 16/2453* (2019.01)
*G06N 5/04* (2006.01)

(58) Field of Classification Search
CPC ......... G06F 17/303424; G06F 17/3043; G06F 17/30539; G06N 20/00; G06N 5/04; G96F 17/30929
See application file for complete search history.

(56) References Cited

U.S. PATENT DOCUMENTS

| | | | | |
|---|---|---|---|---|
| 2014/0201838 A1* | 7/2014 | Varsanyi | ............. | H04L 63/1425 726/23 |
| 2014/0372346 A1* | 12/2014 | Phillipps | ............. | G06N 20/00 706/12 |
| 2015/0379072 A1 | 12/2015 | Dirac et al. | | |
| 2015/0379424 A1* | 12/2015 | Dirac | ............. | G06N 20/00 706/12 |
| 2015/0379429 A1* | 12/2015 | Lee | ............. | G09B 5/00 706/11 |
| 2016/0078361 A1* | 3/2016 | Brueckner | ............. | H04L 67/10 706/12 |
| 2016/0335318 A1* | 11/2016 | Gerweck | ............. | G06F 16/24542 |
| 2017/0103106 A1* | 4/2017 | Kass | ............. | G06F 16/2423 |
| 2018/0018590 A1* | 1/2018 | Szeto | ............. | G06N 20/10 |
| 2018/0101805 A1* | 4/2018 | Park | ............. | G06N 5/022 |
| 2018/0144250 A1* | 5/2018 | Kwon | ............. | G06N 5/006 |
| 2018/0203912 A1* | 7/2018 | Cao | ............. | G06F 16/2471 |
| 2018/0268024 A1* | 9/2018 | Bandyopadhyay | ... | G06F 16/284 |
| 2018/0336198 A1* | 11/2018 | Zhong | ............. | G06N 3/0454 |
| 2018/0357565 A1* | 12/2018 | Syed | ............. | G06N 20/10 |
| 2019/0122139 A1* | 4/2019 | Perez | ............. | G06N 20/20 |
| 2019/0220464 A1* | 7/2019 | Butani | ............. | G06F 16/24542 |
| 2019/0378028 A1* | 12/2019 | Chaudhuri | ............. | G06N 5/048 |
| 2020/0349468 A1* | 11/2020 | Arya | ............. | G06F 16/953 |
| 2021/0004712 A1* | 1/2021 | Sarferaz | ............. | G06N 5/04 |
| 2021/0049174 A1* | 2/2021 | Padmanabhan | ... | G06F 16/24545 |
| 2022/0103589 A1* | 3/2022 | Shen | ............. | G06Q 10/0635 |
| 2022/0120851 A1* | 4/2022 | Prager | ............. | G01S 7/2886 |

* cited by examiner

502 — select ML_service(review) from review_table

504 — select ML_service(storage_location, file_name) from dataset

506 — select ML_function(model_name, inputs, ...) from dataset

508 — select model_name(inputs, ...) from dataset

510 — select V1.result from ML_model(T1) V1

FIG. 5

MACHINE LEARNING INFERENCE CALLS FOR DATABASE QUERY PROCESSING

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with. While machine learning techniques provide many benefits to organizations, use of such machine learning techniques requires significant specialized knowledge that is not easy to use with traditional data processing using relational databases and other data stores.

BRIEF DESCRIPTION OF DRAWINGS

Various embodiments in accordance with the present disclosure will be described with reference to the drawings, in which:

FIG. 5 is a diagram illustrating example user interfaces for machine learning inference calls according to some embodiments.

DETAILED DESCRIPTION

The present disclosure relates to methods, apparatus, systems, and non-transitory computer-readable storage media for machine learning inference calls for database query processing According to some embodiments, machine learning inference calls can be integrated into database queries to enable the use of machine learning techniques without requiring specialized machine learning knowledge on the part of users. In some embodiments, machine learning calls can be integrated into database queries, such as structure query language (SQL) queries, or other popular query languages used to process structured data, without requiring significant changes to applications, database services, etc.

Figure 1:
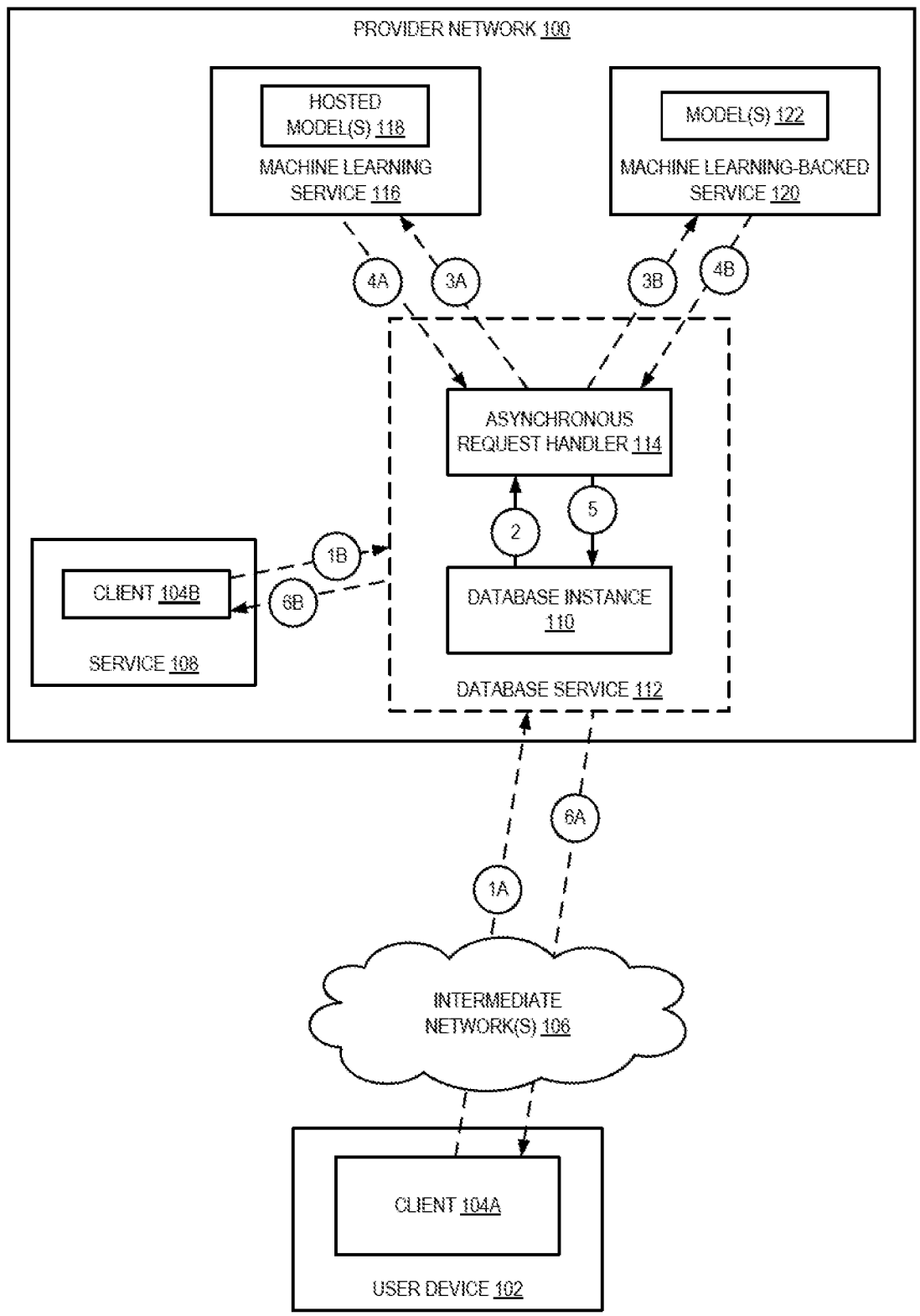
FIG. 1 is a diagram illustrating an environment for machine learning inference calls for database query processing according to some embodiments.

FIG. 1 is a diagram illustrating an environment for machine learning inference calls for database query processing according to some embodiments. As shown in FIG. 1, a provider network 100 can include a database service 112. A user may have structured data which is stored in one or more database instances 110 of database service 112. The data may be added to the database service by the user, from user device 102 or may be added from services of provider network 100 or other services external to provider network 100. This data may be analyzed to obtain useful information for the user. A part of this analysis may include using machine learning techniques to perform inference on the data. For example, text data may be extracted from images stored in database service 112, text data may be analyzed to identify sentiments associated with snippets of the text data, and/or other specialized models may be used to perform inference on the user's data to obtain information about the data. However, as discussed, use of machine learning techniques often requires specialized knowledge and is not well integrated into data management services, such as database service 112. Embodiments address these issues by providing techniques for making machine learning inference calls for database query processing.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s)

104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As shown in FIG. 1, a request can be sent to a database service 112 to perform a query on data stored in one or more database instances 110. In some embodiments, the request can originate from a user device 102, as shown at numeral 1A, or from a service 108 (e.g., a serverless function or other service) of provider network 100, as shown at numeral 1B. In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The request may originate from a client 104A executing on user device 102, or a client 104B of service 108, which may interface with the database service 112 through one or more interfaces, such as application programming interfaces (APIs), text interfaces, graphical user interfaces (GUIs), or other interfaces. The request may include a database query, such as a SQL (or other query language) statement. Although embodiments are described generally using SQL statements, this is for ease of illustration and not intended to be limiting. Embodiments may be similarly implemented using alternative query languages. The database instance 110 can process the query included in the request. In various embodiments, the database service can be updated to identify inference requests included in a database query. In some embodiments, the database service 112 can be updated to be able to identify API calls for APIs published by machine learning-backed service 120. Machine learning-backed service 120 may include one or more pretrained models that may be used to perform inference on user data. The models may be trained for various inference tasks that may be used by multiple users, such as sentiment analysis, text identification, object detection, etc.

In some embodiments, a user may train custom models or provide their own models which are then hosted by a machine learning service 116 as hosted models 118. These hosted models may be used to perform inference tasks that are specific to the user, based on the user's own training data, or otherwise user-specific tasks. In such embodiments, the user may create a function, or model invocation command, which the database service will recognize during query execution. For example, a user may have a hosted model 118 that can be used to perform fraud detection on data stored in database service 112. To perform inference using the model, the user may instruct the database service to recognize when the model is being invoked in a query, such as through a user defined function:

```
create model My_FraudDetection
from [storage location]
returns [type]
(
    [inputs to the model]
);
```

The user may then use the model to perform inference on data in database service 112 in a database query. For example, such a query may include: select My_FraudDetection ([inputs]) from [data source], where the hosted model My_FraudDetection is invoked on data from the data source, such as one or more database tables, particular rows of one or more database tables, etc., based on the inputs. During query processing, a database parser can identify the My_FraudDetection call within the select statement and determine data associated with that call to be provided to the machine learning service to perform inference using the model. For example, the [inputs] may include a statement that identifies one or more columns of a particular database table, or particular row(s) and column(s) of a particular database table, data from multiple database tables, etc. Similarly, if an API associated with a machine learning-backed service is identified during query processing, a database parser can identify the API within the query and determine data associated with the API to be provided to the machine learning-backed service to perform inference using a pretrained model.

At numeral 2, the data to be provided to the machine learning service or the machine learning-backed service can be provided to asynchronous request handler 114. If each record identified as being associated with a machine learning call is passed to the machine learning service or machine learning-backed service individually, the resulting delay (e.g., introduced by the various network calls added by invoking another service and the actual inference time) would lead to a poor user experience. Instead, the query processing of the database instance 110 and the inference performed by the machine learning service 116 or machine learning-backed service 120 can be decoupled using an asynchronous request handler 114.

The asynchronous request handler can receive the data on which inference is to be performed in an input buffer. This enables the database service to send machine learning requests in a batch, where the batch may include a number of records up to the input buffer size. When the asynchronous request handler determined data has been added to the input buffer, the asynchronous request handler 114 can create a mini-batch of data from the input buffer to be sent to the machine learning service or the machine learning backed service, as shown as numerals 3A and 3B, depending on which service was invoked in the query. The mini-batch size may be service-specific, as each service may be configured to receive a different maximum number of records at once. For example, the APIs provided by a given service may place a limit on the number of requests which may be included in a batch. The mini-batch size and the input buffer batch size may be different, and the asynchronous request handler can generate a mini-batch from the requests in its input buffer. In some embodiments, the mini-batch size may be smaller than the input buffer batch size, in which case the asynchronous request handler may generate multiple mini-batches until all of the machine learning requests from the input buffer have been sent to the invoked external service (e.g., machine learning service or machine learning-backed service). In some embodiments, the mini-batch size may be larger than or equal to the input buffer batch size, in which case the mini-batch may include all of the requests included in the input buffer.

In some embodiments, a single query may not generate enough machine learning requests to fill the input buffer of the asynchronous request handler 114. In such cases, the asynchronous request handler may obtain machine learning requests generated by multiple queries, including queries from different users and/or as part of different transactions being performed by the database service.

In response to receiving a mini-batch of machine learning requests, the machine learning service 116 or machine-learning backed service 120 (depending on which service was invoked in the query) can perform inference on the records included in the mini-batch and generate a response for each record. The response can be added to an output buffer of the asynchronous request handler 114 at numerals 4A or 4B. The asynchronous request handler can monitor the output buffer and add a flag or other data indicating that a complete set of responses has been received for the mini-batch of requests that was sent. The database service can monitor the output buffer and, when a flag is identified, can pull the responses from the output buffer, as shown at numeral 5. In some embodiments, where the asynchronous request handler is processing requests from multiple users and/or transactions each database instance may monitor the output buffer for its particular responses and pull only those responses which correspond to the requests sent by that instance. In some embodiments, each response may identify the request, database instance, user, and/or transaction with which the response is associated. Query processing may be completed by the database instance using the response from the machine learning service and/or the machine learning-backed service and, at numeral 6A or 6B, the result of the query can be returned.

Figure 2:
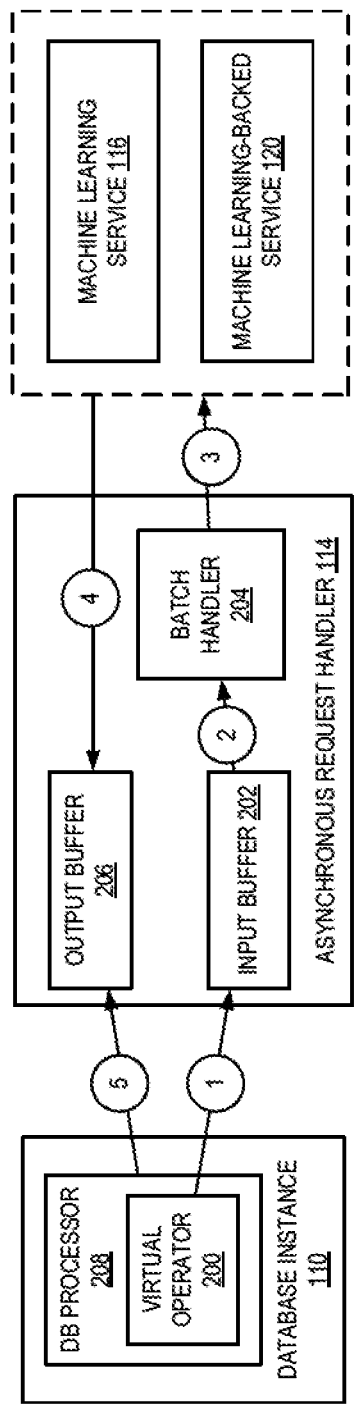
FIG. 2 is a diagram illustrating an asynchronous request handler according to some embodiments.

FIG. 2 is a diagram illustrating an asynchronous request handler according to some embodiments. When a database instance 110 processes a query it can identify a query execution plan to perform the query. A given query can be executed in many different ways, and each way may offer different performance characteristics. A query optimizer may best query execution plan for a given query, based on one or more performance requirements for the query. In some embodiments, during query execution, the database processor 208 can create a virtual operator 200 which enables execution of the query execution plan to add a thread in which machine learning request(s) can be sent and response can be received without blocking a main query processing thread. In some embodiments, the query optimizer can change an evaluation order of the predicates in the query to reduce the number of records that require machine learning calls to be made by the virtual operator 200.

Virtual operator 200 can identify records that need to be sent to a machine learning service or machine learning-backed service in batches equal to the input buffer 202 size of the asynchronous request handler 114. In some embodiments, virtual operator 200 may be implemented as a temporary data structure (e.g., temporary file, scratch pad, or other data structure) which may be used to perform at least a portion of the query to identify the records that are to be sent to the machine learning service or the machine learning-backed service. For example, a query may specify that data from multiple tables in the database service are to be joined and then a portion of the records in the joined data may be identified to be sent to the machine learning service or the machine learning backed service. By using the virtual operator, machine learning requests can be identified and sent to the asynchronous request handler in parallel to processing other portions of the query. At numeral 1, a batch of machine learning requests (e.g., including a record, a model endpoint/API, etc.) can be sent to the input buffer 202. In some embodiments, a different input buffer may be maintained for each machine learning service and machine learning-backed service to which the machine learning requests may be sent. Each input buffer may be implemented as a queue or other data structure to which the requests may be added by the virtual operator. A batch handler 204 can generate mini-batches of an appropriate size for the service being invoked. For example, at numeral 2, batch handler 204 can divide the input batch from input buffer 202 into multiple mini-batches to be sent to the invoked service. At numeral 3, each mini-batch can be sent, in turn, to the invoked external service (e.g., machine learning service 116 or machine learning-backed service 120). As discussed, in some embodiments, the input batch size may be smaller than the batch size associated with the invoked external service. In such instances, the mini-batch may include all of the machine learning requests from the input batch.

As the machine learning responses are generated, the external service can add the results to an output buffer 206 of the asynchronous request handler 114, as shown at numeral 4. When each mini-batch has been completely processed, the external service can add a flag or other indicator to the output buffer indicating that processing of the mini-batch is complete. In some embodiments, the external service may additionally, or alternatively, add a flag or other indicator to the output buffer once all machine learning requests associated with a given transaction have been completed. Database processor 208 can be simultaneously executing the query execution plan while the machine learning requests and response are obtained in a separate thread. When query execution reaches the machine learning service invocation (e.g., the API call, user defined function, etc.), the database processor 208 can access the output buffer 206 for the machine learning responses, at numeral 5. If the responses have not yet been populated in the output buffering, processing can wait until a flag (or flags) has been set in the output buffer indicating that processing is complete.

Figure 3:
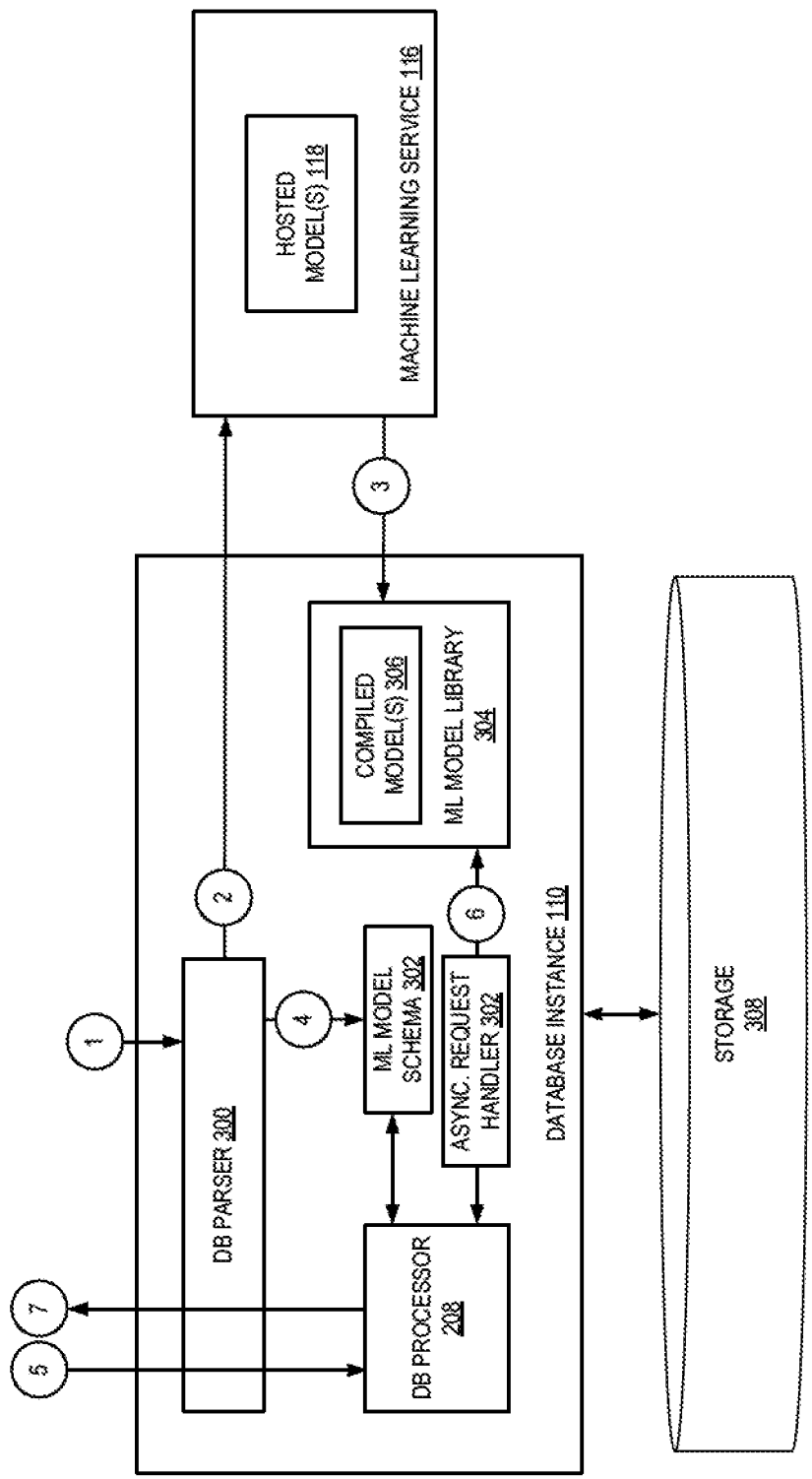
FIG. 3 is a diagram illustrating an environment for machine learning inference calls for database query processing using a local machine learning model according to some embodiments.

FIG. 3 is a diagram illustrating an environment for machine learning inference calls for database query processing using a local machine learning model according to some embodiments. As discussed, when used with a machine learning service 116 and a hosted model 118, the user can define a function associated with the hosted model 118 such that the database instance can identify that the machine learning service is being invoked. At numeral 1, the user defined function statement can be received by the database parser 200 (e.g., a SQL parser or other parser). In some embodiments, to reduce the number of network calls required by the database service, at numeral 2, a request can be sent to the machine learning service for the model identified in the user defined function statement. This request can include performance, hardware, or other characteristics of the database instance. The machine learning service can compile a copy of the model for the database instance and, at numeral 3, return the model to the database instance. In some embodiments, the compiled model 306 may be implemented in a shared library 304.

At numeral 4, a model schema 302 can be generated which maps the invoked machine learning model to a compiled model 306. Subsequently, at numeral 5, a query can be received by the database instance 110 which invokes the model. The database processor can use the model schema 302 to identify the corresponding compiled model 306 in the model library 304 and direct the machine learning requests to the compiled model via the asynchronous request handler 302, as shown at numeral 6. Processing of the machine learning requests and responses may proceed generally as described above with respect to FIG. 2, except instead of sending a mini-batch of requests via a network call to an external service, the mini-batch of request is sent locally to the compiled model 306 in the model library 304. This reduces the number of network calls required to the number of models being used in a given transaction.

Figure 4:
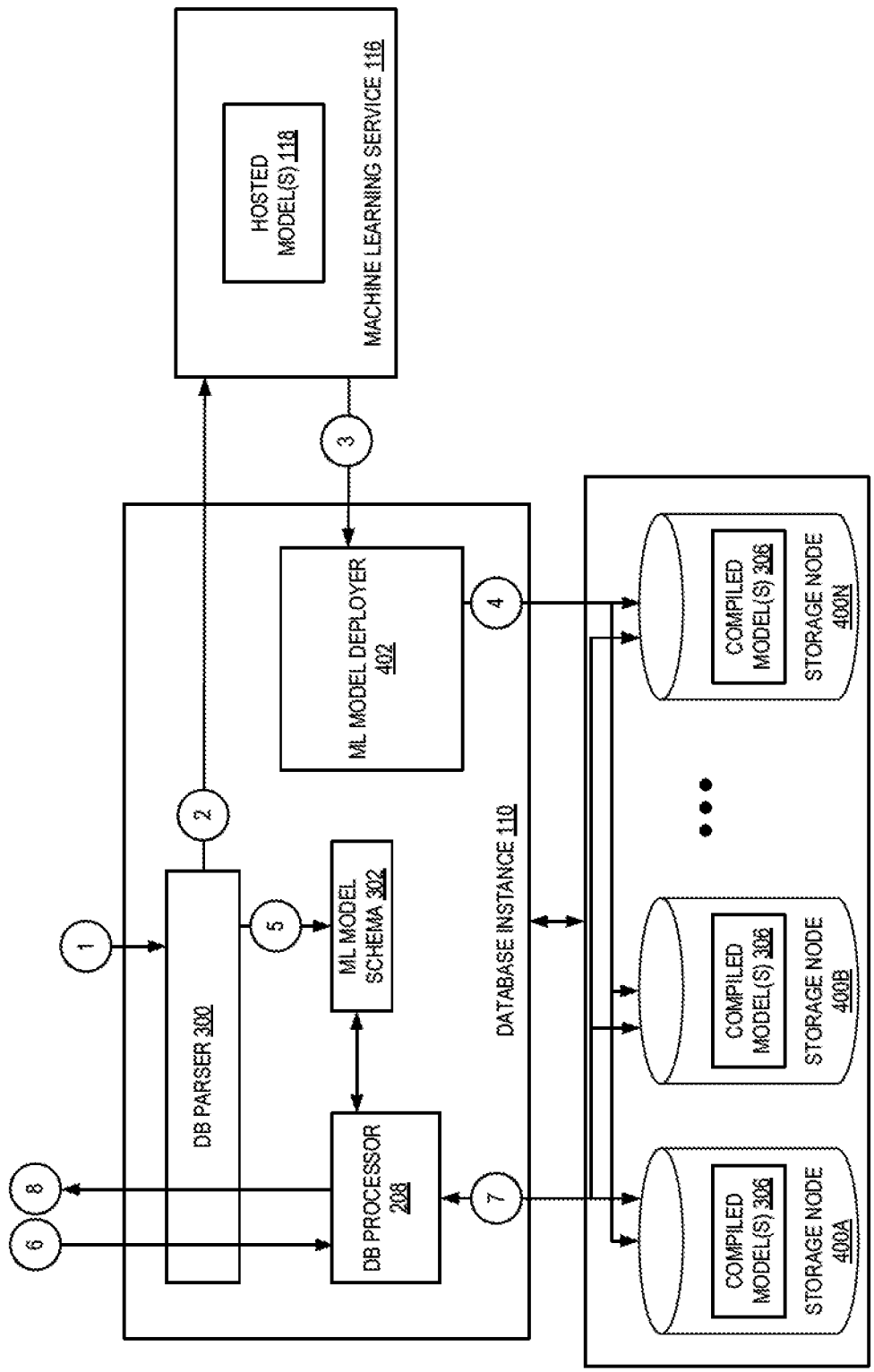
FIG. 4 is a diagram illustrating an alternative environment for machine learning inference calls for database query processing using a local machine learning model according to some embodiments.

FIG. 4 is a diagram illustrating an alternative environment for machine learning inference calls for database query processing using a local machine learning model according to some embodiments. In the embodiment of FIG. 4, the database service may be implemented as a plurality of nodes, including the database instance 110 (e.g., a head node) and a plurality of nodes 400A-400N. The data stored in the database instance may be spread across the plurality of storage nodes. Numerals 1-3 may proceed as discussed above with respect to FIG. 3, however at numeral 3 the compiled model is received by a model deployer 402. Model deployer 402 can obtain the compiled model and, at numeral 4, deploy a copy of the model to each storage node 400A-400N.

At numeral 5, a model schema 302 can be generated which maps the invoked machine learning model to a compiled model 306. Subsequently, at numeral 6, a query can be received by the database instance 110 which invokes the model. At numeral 7, the query can be executed in parallel on one or more of the storage nodes based on where the data is stored. As the query is processed in parallel, inference may also be performed in parallel on each storage node using the compiled model 306 identified using the model schema 302. In some embodiments, each node may also include an asynchronous request handler which can pass batches of requests to each compiled model on its corresponding storage node. Processing of the machine learning requests and responses may proceed generally as described above with respect to FIG. 2, except instead of sending a mini-batch of requests via a network call to an external service, the mini-batch of request is sent locally to the compiled model 306 in the model library 304. This reduces the number of network calls required to the number of models being used in a given transaction.

FIG. 5 is a diagram illustrating example user interfaces for machine learning inference calls according to some embodiments. As shown in FIG. 5, multiple user interfaces (UIs) 500 can be implemented to enable inference calls to be made within a given database query. For example, UI 502 can invoke a machine learning service using ML_service function (or other user defined function) on text input (e.g., through the select statement identifying, e.g., a column named "review" from a database table named "review_table." Additionally, or alternatively, UI 504 can be used to perform inference on arbitrary data types, such as files of "file_name" stored at a "storage_location" (e.g., a data store name, URI, URL, or other location identifier) from a dataset, such as a database table. Additionally, or alternatively, UI 506 can invoke a user defined function "ML_function", which as previously discussed, may be defined by a user to invoke a particular model (e.g., model_name) to perform inference on records from a dataset based on one or more input values. In some embodiments, the model may be invoked directly, as shown at UI 508, rather than using the user defined function shown in UI 506. In some embodiments, a view style UI 510 can be used to invoke a model to perform inference on particular records (such as those included in table T1, as shown in FIG. 5, or on other records as defined in a predicate statement) from a predefined view V1.

Figure 6:
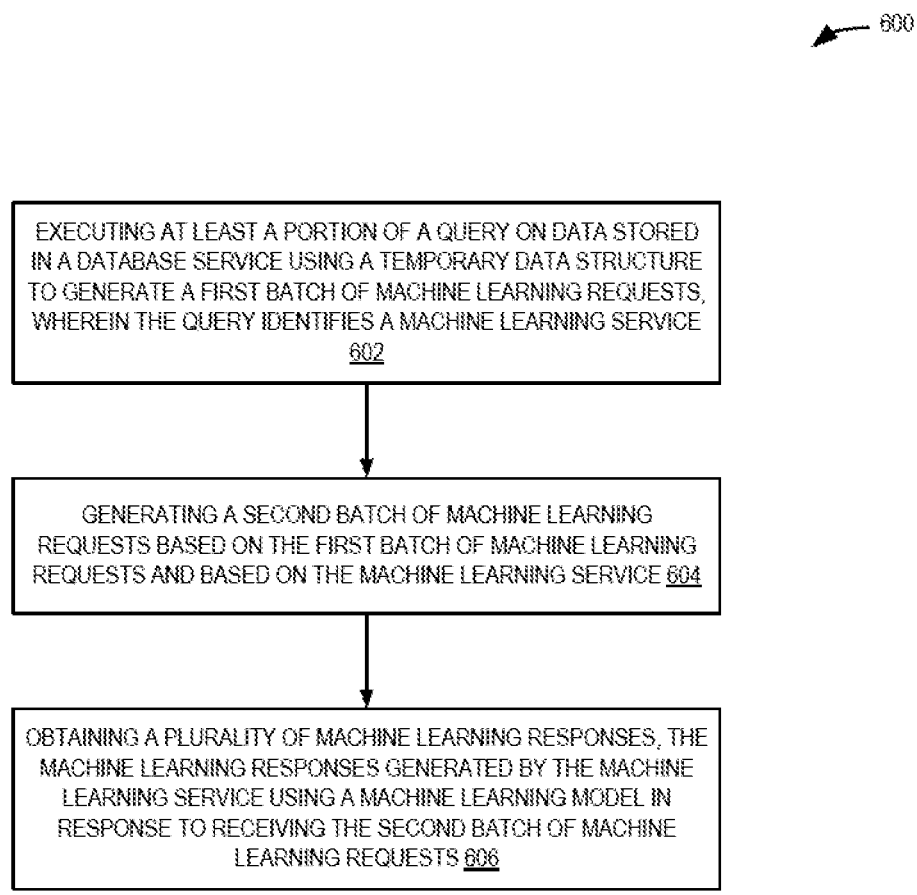
FIG. 6 is a flow diagram illustrating operations of a method for making machine learning inference calls for database query processing according to some embodiments.

FIG. 6 is a flow diagram illustrating operations 600 of a method for making machine learning inference calls for database query processing according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by database instance 110, asynchronous request handler 114, etc. of the other figures.

The operations 600 include, at block 602, executing at least a portion of a query on data stored in a database service using a temporary data structure to generate a first batch of machine learning requests, wherein the query identifies a machine learning service. In some embodiments, the temporary data structure may be a virtual operator which is created by the database processor to perform all or parts of the query. In some embodiments, the query plan identified to execute all or part of the query may be optimized to reduce the number of machine learning calls that need to be made to process the query. In some embodiments, the query is a structured query language (SQL) query. In some embodiments, the SQL query identifies the machine learning using an application programming interface (API) call to the machine learning service. In some embodiments, the machine learning service publishes the API to perform inference using the machine learning model in response to requests received from a plurality of users. In some embodiments, the query identifies the machine learning service using an endpoint associated with the machine learning model hosted by the machine learning service.

The operations 600 further include, at block 604, generating a second batch of machine learning requests based on the first batch of machine learning requests and based on the machine learning service. In some embodiments, the first batch of machine learning requests can be added to an input buffer of an asynchronous request handler. As discussed, the asynchronous request handler can manage machine learning requests to be sent to a machine learning service or a machine learning-backed service. In some embodiments, the second batch of machine learning requests is sent to the machine learning service over at least one network. In some embodiments, the second batch size is different from the first batch size, and wherein the second batch size is associated with the machine learning service. For example, the machine learning service may have a maximum batch size, which limits the number of requests which may be sent in a batch to the machine learning service. In some embodiments, the first batch of machine learning requests includes machine learning requests generated in response to multiple queries received from a plurality of different users.

In some embodiments, the operations 600 may further include sending a request to the machine learning service for the machine learning model, receiving the machine learning model from the machine learning service, the machine learning model compiled for the database service by the machine learning service, and wherein the second batch of machine learning requests is sent to the machine learning model hosted by the database service. In some embodiments, the operations 600 may further include storing a copy of the machine learning model in a plurality of nodes of the database service, wherein machine learning requests generated during the query processing by a particular node of the database service are sent to the copy of the machine learning model stored on the particular node.

The operations 600 further include, at block 606, obtaining a plurality of machine learning responses, the machine learning responses generated by the machine learning service using a machine learning model in response to receiving the second batch of machine learning requests. In some embodiments, as discussed, the plurality of machine learning responses may be added to an output buffer of the asynchronous request handler. The database processor may obtain the machine learning responses from the output buffer and use the responses to complete processing of the query.

In some embodiments, the operations 600 may include receiving a request at a database service, wherein the request includes a structured query language (SQL) query to be performed on at least a portion of a dataset in the database service and wherein the request identifies a machine learning service to be used in processing the SQL query, creating a virtual operator to perform at least a portion of the SQL query, generating a first batch of machine learning requests based at least on the portion of the SQL query performed by the virtual operator, sending the first batch of machine learning requests to an input buffer of an asynchronous request handler, the asynchronous request handler to generate a second batch of machine learning requests based on the first batch of machine learning requests, obtaining a plurality of machine learning responses from an output buffer of the asynchronous request handler, the machine learning responses generated by the machine learning service using a machine learning model in response to receiving the second batch of machine learning requests, and generating a query response based on the machine learning responses.

In some embodiments, generating a first batch of machine learning requests based at least on the SQL query, further comprises determining a query execution plan that minimizes a number of records associated with machine learning request. In some embodiments, the machine learning service adds a flag to the output buffer when the second batch of machine learning requests has been processed.

Figure 7:
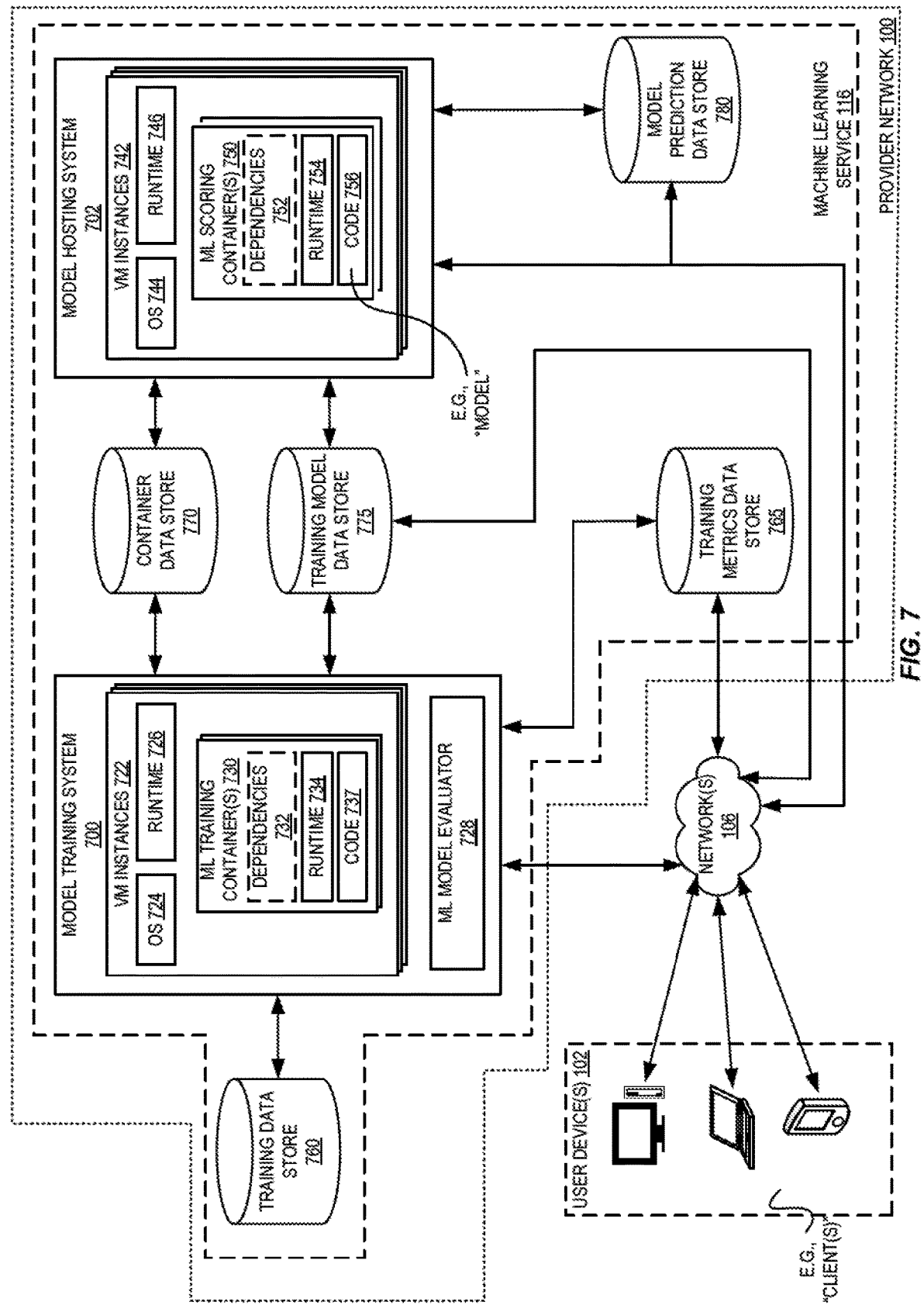
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 102, a model training system 700, a model hosting system 702, a training data store 760, a training metrics data store 765, a container data store 770, a training model data store 775, and a model prediction data store 780.

A machine learning service 116 described herein may include one or more of these entities, such as the model hosting system 702, model training system 702, and so forth.

In some embodiments, users, by way of user devices 102, interact with the model training system 702 to provide data that causes the model training system 702 to train one or more machine learning models, for example, as described elsewhere herein. A machine learning model, generally, may be thought of as one or more equations that are "trained" using a set of data. In some embodiments, the model training system 702 provides ML functionalities as a web service, and thus messaging between user devices 102 and the model training system 702 (or provider network 100), and/or between components of the model training system 702 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 102 can interact with the model training system 702 via frontend 729 of the model training system 702. For example, a user devices 102 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user devices 102, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user devices 102 may provide, in the training request, an algorithm written in any programming language. The model training system 702 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user devices 102, may develop an algorithm/code using an application (for example, an interactive web-based programming environment) and cause the algorithm/code to be provided—perhaps as part of a training request (or referenced in a training request)—to the model training system 702, where this algorithm/code may be containerized on its own or used together with an existing container having a machine learning framework, for example.

In some embodiments, instead of providing a container image in the training request, the user devices 102 provides, in the training request, an indicator of a container image (for example, an indication of an address or a location at which a container image is stored). For example, the container image can be stored in a container data store 770, and this container image may have been previously created/uploaded by the user. The model training system 702 can retrieve the container image from the indicated location and create a container using the retrieved container image. The container is then loaded into a virtual machine instance 722 for training a machine learning model, as described in greater detail below.

The model training system 702 can use the information provided by the user devices 102 to train a machine learning model in one or more pre-established virtual machine instances 722 in some embodiments. In particular, the model training system 702 includes a single physical computing device or multiple physical computing devices that are interconnected using one or more computing networks (not shown), where the physical computing device(s) host one or more virtual machine instances 722. The model training system 702 can handle the acquisition and configuration of compute capacity (for example, containers, instances, etc., which are described in greater detail below) based on the information describing the computing machine on which to train a machine learning model provided by the user devices 102. The model training system 702 can then train machine learning models using the compute capacity, as is described in greater detail below. The model training system 702 can automatically scale up and down based on the volume of training requests received from user devices 102 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 702 uses one or more container images included in a training request (or a container image retrieved from the container data store 770 in response to a received training request) to create and initialize a ML training container 730 in a virtual machine instance 722. For example, the model training system 702 creates a ML training container 730 that includes the container image(s) and/or a top container layer.

Prior to beginning the training process, in some embodiments, the model training system 702 retrieves training data from the location indicated in the training request. For example, the location indicated in the training request can be a location in the training data store 760. Thus, the model training system 702 retrieves the training data from the indicated location in the training data store 760. In some embodiments, the model training system 702 does not retrieve the training data prior to beginning the training process. Rather, the model training system 702 streams the training data from the indicated location during the training process. For example, the model training system 702 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 702 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 702 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 702 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user devices 102 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 702 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 702 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 702 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 702 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 702 can significantly reduce the training time in some embodiments.

In some embodiments, the model training system 702 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 702 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user devices 102, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user devices 102, can transmit a request to the model training system 702 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 702 can modify the machine learning model accordingly. For example, the model training system 702 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 702 can cause the virtual machine instance 722 to modify the execution of code stored in an existing ML training container 730 according to the data provided in the modification request. In some embodiments, the user, via the user devices 102, can transmit a request to the model training system 702 to stop the machine learning model training process. The model training system 702 can then instruct the virtual machine instance 722 to delete the ML training container 730 and/or to delete any model data stored in the training model data store 775.

As described below, in some embodiments, the model data stored in the training model data store 775 is used by the model hosting system 700 to deploy machine learning models. Alternatively or additionally, a user device 102 or another computing device (not shown) can retrieve the model data from the training model data store 775 to implement a learning algorithm in an external device. As an illustrative example, a robotic device can include sensors to capture input data. A user device 102 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 102 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 102, the model hosting system 700, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 700 includes a single physical computing device or multiple physical computing devices that are interconnected using one or more computing networks (not shown), where the physical computing device(s) host one or more virtual machine instances 742. The model hosting system 700 can handle the acquisition and configuration of compute capacity (for example, containers, instances, etc.) based on demand for the execution of trained machine learning models. The model hosting system 700 can then execute machine learning models using the compute capacity, as is described in greater detail below. The model hosting system 700 can automatically scale up and down based on the volume of execution requests received from user devices 102 via frontend of the model hosting system 700, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 700 uses one or more container images included in a deployment request (or a container image retrieved from the container data store 770 in response to a received deployment request) to create and initialize a ML scoring container 750 in a virtual machine instance 742. For example, the model hosting system 700 creates a ML scoring container 750 that includes the container image(s) and/or a top container layer.

As described above, a user device 102 can submit a deployment request and/or an execution request to the model hosting system 700 via the frontend in some embodiments. A deployment request causes the model hosting system 700 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 700 initializes ones or more ML scoring containers 750 in one or more hosted virtual machine instance 742. In embodiments in which the deployment request includes an identification of one or more container images, the model hosting system 700 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 700 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 700 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 700 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 700 unarchives or decompresses the model data file to obtain multiple individual files and inserts the individual files into the ML scoring container 750. In some embodiments, the model hosting system 700 stores the model data file in the same location as the location in which the model data file was stored in the ML training container 730 that generated the model data file. For example, the model data file initially was stored in the top container layer of the ML training container 730 at a certain offset, and the model hosting system 700 then stores the model data file in the top container layer of the ML scoring container 750 at the same offset.

In embodiments in which multiple model data files are identified in the deployment request, the model hosting system 700 retrieves the identified model data files from the training model data store 775. The model hosting system 700 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 700 associates the initialized ML scoring container(s) 750 with the endpoint identified in the deployment request. For example, each of the initialized ML scoring container(s) 750 can be associated with a network address. The model hosting system 700 can map the network address(es) to the identified endpoint, and the model hosting system 700 or another system (for example, a routing system, not shown) can store the mapping. Thus, a user device 102 can refer to trained machine learning model(s) stored in the ML scoring container(s) 750 using the endpoint. This allows for the network address of an ML scoring container 750 to change without causing the user operating the user device 102 to change the way in which the user refers to a trained machine learning model.

Once the ML scoring container(s) 750 are initialized, the ML scoring container(s) 750 are ready to execute trained machine learning model(s). In some embodiments, the user device 102 transmits an execution request to the model hosting system 700 via the frontend, where the execution request identifies an endpoint and includes an input to a machine learning model (for example, a set of input data). The model hosting system 700 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 700 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 102 that submitted the execution result via the frontend.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 102 via the frontend (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 700 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 102, the model training system 702, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 702 and the model hosting system 700 depicted in FIG. 7 are not meant to be limiting. For example, the model training system 702 and/or the model hosting system 700 could also operate within a computing environment having a fewer or greater number of devices than are illustrated in FIG. 7. Thus, the depiction of the model training system 702 and/or the model hosting system 700 in FIG. 7 may be taken as illustrative and not limiting to the present disclosure. For example, the model training system 702 and/or the model hosting system 700 or various constituents thereof could implement various web services components, hosted or "cloud" computing environments, and/or peer-to-peer network configurations to implement at least a portion of the processes described herein. In some embodiments, the model training system 702 and/or the model hosting system 700 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 102 and provisions virtual machine instances 722. In some embodiments, the frontend 729 serves as a front door to all the other services provided by the model training system 702. The frontend 729 processes the requests and makes sure that the requests are properly authorized. For example, the frontend 729 may determine whether the user associated with the training request is authorized to initiate the training process.

Similarly, frontend processes all deployment and execution requests received from user devices 102 and provisions virtual machine instances 742. In some embodiments, the frontend serves as a front door to all the other services provided by the model hosting system 700. The frontend processes the requests and makes sure that the requests are properly authorized. For example, the frontend may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 702 and the model hosting system 700, this is not meant to be limiting. For example, in some embodiments not shown, the training data store 760 is located internal to at least one of the model training system 702 or the model hosting system 700.

In some embodiments, the training metrics data store 765 stores model metrics. While the training metrics data store 765 is depicted as being located external to the model training system 702 and the model hosting system 700, this is not meant to be limiting. For example, in some embodiments not shown, the training metrics data store 765 is located internal to at least one of the model training system 702 or the model hosting system 700.

The container data store 770 stores container images, such as container images used to form ML training containers 730 and/or ML scoring containers 750, that can be retrieved by various virtual machine instances 722 and/or 742. While the container data store 770 is depicted as being located external to the model training system 702 and the model hosting system 700, this is not meant to be limiting. For example, in some embodiments not shown, the container data store 770 is located internal to at least one of the model training system 702 and the model hosting system 700.

The training model data store 775 stores model data files. In some embodiments, some of the model data files are comprised of a single file, while other model data files are packages of multiple individual files. While the training model data store 775 is depicted as being located external to the model training system 702 and the model hosting system 700, this is not meant to be limiting. For example, in some embodiments not shown, the training model data store 775 is located internal to at least one of the model training system 702 or the model hosting system 700.

The model prediction data store 780 stores outputs (for example, execution results) generated by the ML scoring containers 750 in some embodiments. While the model prediction data store 780 is depicted as being located external to the model training system 702 and the model hosting system 700, this is not meant to be limiting. For example, in some embodiments not shown, the model prediction data store 780 is located internal to at least one of the model training system 702 and the model hosting system 700.

While the model training system 702, the model hosting system 700, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 102 via the one or more network(s) 106.

Various example user devices 102 are shown in FIG. 7, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 702 and/or the model hosting system 700 provides the user devices 102 with one or more user interfaces, command-line interfaces (CLI), application programming interfaces (API), and/or other programmatic interfaces for submitting training requests, deployment requests, and/or execution requests. In some embodiments, the user devices 102 can execute a stand-alone application that interacts with the model training system 702 and/or the model hosting system 700 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
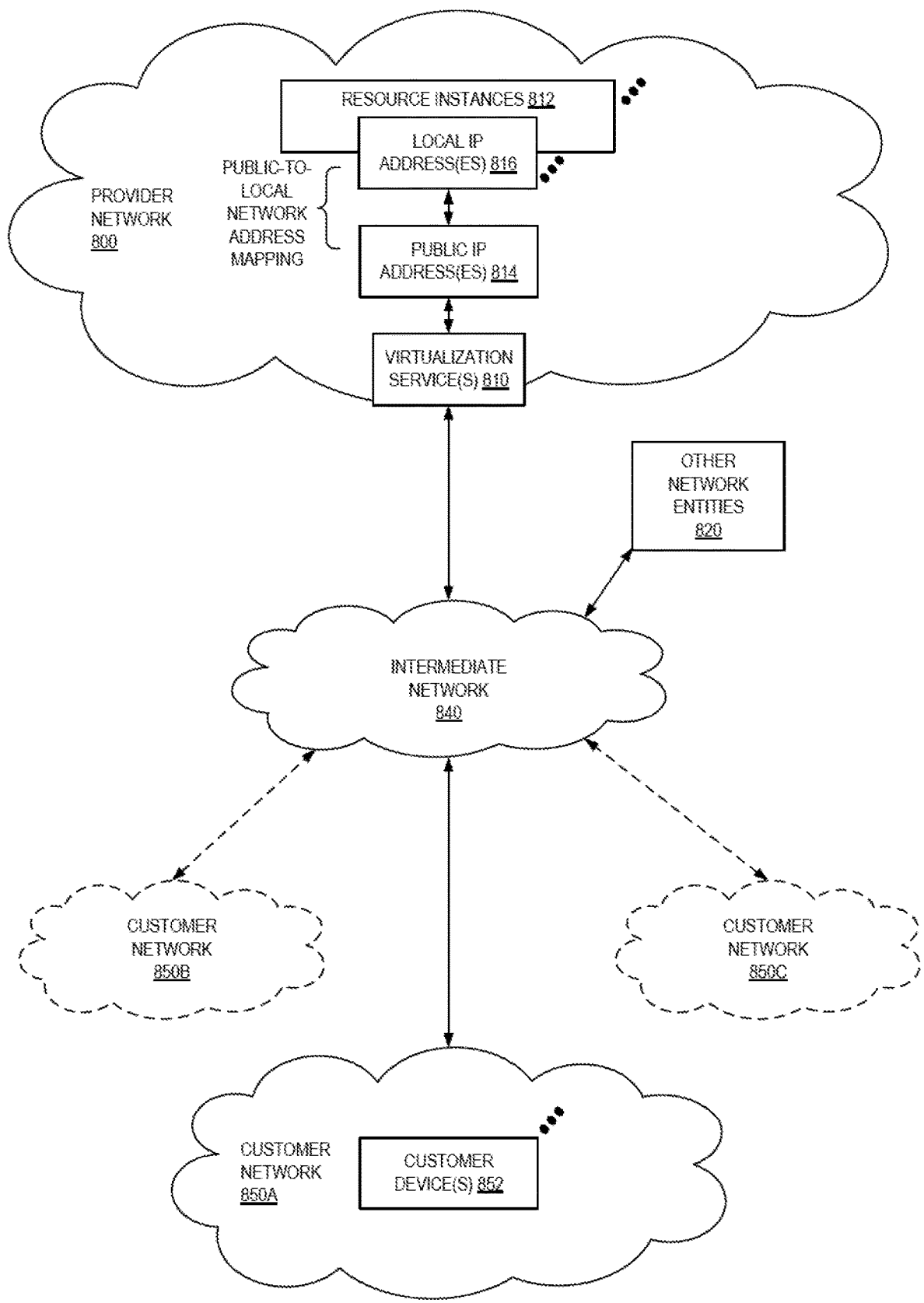
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
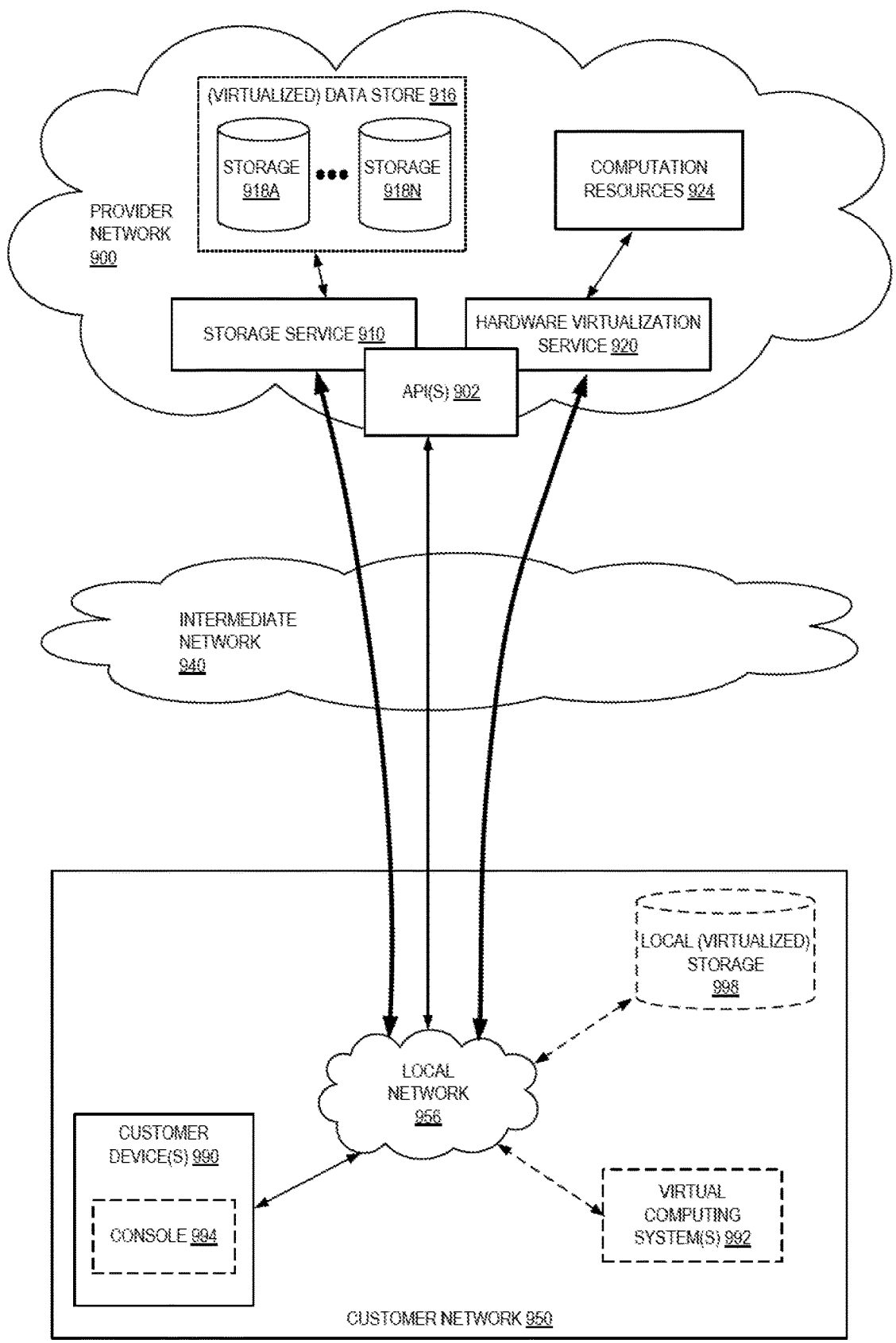
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
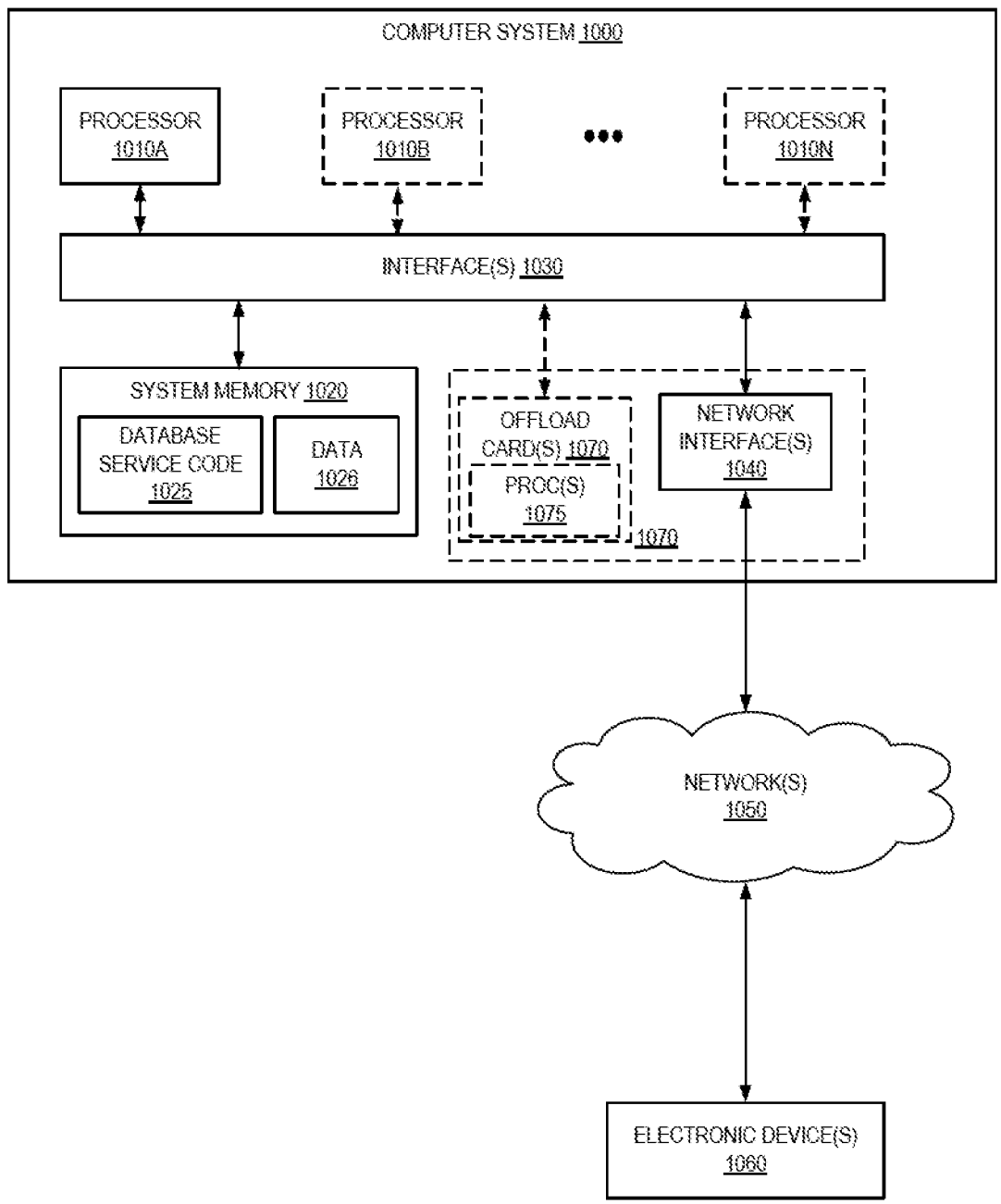
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as database service code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request at a database service, wherein the request includes a structured query language (SQL) query to be performed on at least a portion of a dataset in the database service and wherein the request identifies a machine learning service to be used in processing the SQL query;
creating a virtual operator to perform at least a portion of the SQL query;
generating a first batch of machine learning requests based at least on the portion of the SQL query performed by the virtual operator;
sending the first batch of machine learning requests to an input buffer of an asynchronous request handler, the asynchronous request handler to generate a second batch of machine learning requests based on the first batch of machine learning requests;
obtaining a plurality of machine learning responses from an output buffer of the asynchronous request handler, the machine learning responses generated by the machine learning service using a machine learning model in response to receiving the second batch of machine learning requests, wherein the machine learning service publishes an application programming interface (API) to perform inference using the machine learning model in response to requests received from a plurality of users; and
generating a query response based on the machine learning responses.

2. The computer-implemented method of claim 1, wherein generating a first batch of machine learning requests based at least on the SQL query, further comprises:
determining a query execution plan that minimizes a number of records associated with machine learning request.

3. The computer-implemented method of claim 1, wherein the machine learning service adds a flag to the output buffer when the second batch of machine learning requests has been processed.

4. A computer-implemented method comprising:
executing at least a portion of a query on data stored in a database service using a temporary data structure to generate a first batch of machine learning requests, wherein the query is a structured query language (SQL) query, wherein the query identifies a machine learning service using an application programming interface (API) call to the machine learning service, and wherein the machine learning service publishes the API to perform inference using the machine learning model in response to requests received from a plurality of users;
generating a second batch of machine learning requests based on the first batch of machine learning requests and based on the machine learning service; and
obtaining a plurality of machine learning responses, the machine learning responses generated by the machine learning service using a machine learning model in response to receiving the second batch of machine learning requests.

5. The computer-implemented method of claim 4, wherein the query identifies the machine learning service using an endpoint associated with the machine learning model hosted by the machine learning service.

6. The computer-implemented method of claim 4, wherein the second batch of machine learning requests is sent to the machine learning service over at least one network.

7. The computer-implemented method of claim 4, further comprising:
sending a request to the machine learning service for the machine learning model;
receiving the machine learning model from the machine learning service, the machine learning model compiled for the database service by the machine learning service; and
wherein the second batch of machine learning requests is sent to the machine learning model hosted by the database service.

8. The computer-implemented method of claim 7, further comprising:
storing a copy of the machine learning model in a plurality of nodes of the database service, wherein machine learning requests generated during the query processing by a particular node of the database service are sent to the copy of the machine learning model stored on the particular node.

9. The computer-implemented method of claim 4, wherein the second batch size is different from the first batch size, and wherein the second batch size is associated with the machine learning service.

10. The computer-implemented method of claim 4, wherein the first batch of machine learning requests includes machine learning requests generated in response to multiple queries received from a plurality of different users.

11. A system comprising:
a machine learning service implemented by a first one or more electronic devices; and
a database service implemented by a second one or more electronic devices, the database service including instructions that upon execution cause the database service to:
execute at least a portion of a query on data stored in a database service using a temporary data structure to generate a first batch of machine learning requests, wherein the query is a structured query language (SQL) query, wherein the query identifies the machine learning service using an application programming interface (API) call to the machine learning service, and wherein the machine learning service publishes the API to perform inference using the machine learning model in response to requests received from a plurality of users;
generating a second batch of machine learning requests based on the first batch of machine learning requests and based on the machine learning service; and
obtain a plurality of machine learning responses, the machine learning responses generated by the machine learning service using a machine learning model in response to receiving the second batch of machine learning requests.

12. The system of claim 11, wherein the query identifies the machine learning service using an endpoint associated with the machine learning model hosted by the machine learning service.

13. The system of claim 11, wherein the second batch of machine learning requests is sent to the machine learning service over at least one network.

14. The system of claim 11, further comprising:
sending a request to the machine learning service for the machine learning model;
receiving the machine learning model from the machine learning service, the machine learning model compiled for the database service by the machine learning service;
wherein the second batch of machine learning requests is sent to the machine learning model hosted by the database service; and
storing a copy of the machine learning model in a plurality of nodes of the database service, wherein machine learning requests generated during the query processing by a particular node of the database service are sent to the copy of the machine learning model stored on the particular node.

* * * * *